United States Patent
Finkler et al.

(10) Patent No.: US 9,421,501 B2
(45) Date of Patent: Aug. 23, 2016

(54) DELAMINATION FREE MEMBRANE

(75) Inventors: Christian Finkler, Nonnweiler (DE); Rainer Fislage, St. Wendel (DE); Torsten Keller, Hermeskeil (DE); Igor Raiko, Bad Homburg (DE); Roland Sander, St. Wendel (DE)

(73) Assignee: FRESENIUS MEDICAL CARE DEUTSCHLAND GMBH, Bad Homburg (DE)

( * ) Notice: Subject to any disclaimer, the term of this patent is extended or adjusted under 35 U.S.C. 154(b) by 854 days.

(21) Appl. No.: 13/330,840

(22) Filed: Dec. 20, 2011

(65) Prior Publication Data

US 2012/0210869 A1 Aug. 23, 2012

Related U.S. Application Data

(60) Provisional application No. 61/425,890, filed on Dec. 22, 2010.

(30) Foreign Application Priority Data

Dec. 22, 2010 (DE) ........................ 10 2010 055 731
Feb. 10, 2011 (DE) ........................ 10 2011 010 921

(51) Int. Cl.

| | | |
|---|---|---|
| B01D 71/16 | (2006.01) | |
| B01D 71/60 | (2006.01) | |
| B01D 69/12 | (2006.01) | |
| B01D 69/08 | (2006.01) | |
| B01D 69/10 | (2006.01) | |

(52) U.S. Cl.
CPC ............. B01D 69/08 (2013.01); B01D 69/088 (2013.01); B01D 69/10 (2013.01); B01D 69/12 (2013.01); B01D 71/16 (2013.01); B01D 71/60 (2013.01); *B01D 2323/30* (2013.01)

(58) Field of Classification Search
CPC .................................................... B01D 69/088
See application file for complete search history.

(56) References Cited

U.S. PATENT DOCUMENTS

| | | | |
|---|---|---|---|
| 3,744,642 A | 7/1973 | Scala et al. | |
| 4,164,437 A | 8/1979 | Henne et al. | |
| 4,276,172 A | 6/1981 | Henne et al. | |
| 4,704,324 A | 11/1987 | Davis et al. | |
| 4,826,599 A * | 5/1989 | Bikson et al. | 210/500.3 |
| 4,872,982 A | 10/1989 | Taylor | |
| 4,976,869 A | 12/1990 | Taylor | |
| 5,141,642 A | 8/1992 | Kusuki et al. | |
| RE34,115 E * | 10/1992 | Coplan et al. | 427/245 |
| 5,156,740 A | 10/1992 | Bruschke | |
| 5,492,625 A | 2/1996 | Wytcherley et al. | |
| 5,753,008 A * | 5/1998 | Friesen et al. | 95/45 |
| 7,393,195 B2 | 7/2008 | Keller et al. | |
| 2006/0068206 A1 | 3/2006 | Hala et al. | |
| 2009/0078640 A1* | 3/2009 | Chu et al. | 210/321.6 |
| 2011/0266222 A1* | 11/2011 | Wang et al. | 210/650 |

FOREIGN PATENT DOCUMENTS

| | | |
|---|---|---|
| CA | 2 707 818 A1 | 7/2009 |
| DE | 689 15 742 T2 | 1/1995 |
| DE | 694 14 523 T2 | 4/1999 |
| DE | 10 2004 063 215 A1 | 2/2007 |
| EP | 0 286 091 A2 | 10/1988 |
| EP | 0 359 834 A1 | 3/1990 |
| EP | 0 719 581 A2 | 7/1996 |
| EP | 1 640 134 A1 | 3/2006 |
| JP | S63-194701 A | 8/1988 |
| JP | 2001/000843 A | 1/2001 |
| JP | 2003/200026 A | 7/2003 |
| JP | 2004/261765 A | 9/2004 |
| WO | WO-03/076056 A1 | 9/2003 |
| WO | WO-2005/014266 A1 | 2/2005 |
| WO | WO-2006/034575 A1 | 4/2006 |
| WO | WO-2009/108138 A1 | 9/2009 |

OTHER PUBLICATIONS

International Search Report for PCT/EP2011/006154, 4 pages (Mar. 13, 2012).
Mulder, M., Basic Principles of Membrane Technology, Second Edition, Kluwer Academic Publishers, Springer Netherlands, pp. 71-91 (1996).
Pereira, C.C. et al., Hollow fiber membranes obtained by simultaneous spinning of two polymer solutions: a morphological study, Journal Membrane Sciences, 226:35-50 (2003).
Schreiber, C. et al., Ch. 69: Grundlagen der nieren- und Leberdialyse, Medizintechnik, Life Science Engineering, Fifth Edition, Wintermantel, E. And Ha, S-W., eds, Springer-Verlag Berlin Heidelberg, p. 1540 (2009).

* cited by examiner

*Primary Examiner* — Krishnan S Menon
(74) *Attorney, Agent, or Firm* — Choate, Hall & Stewart LLP; William R. Haulbrook; John J. Cahill

(57) ABSTRACT

The present invention relates to a membrane, in particular to a hollow fiber membrane comprising a membrane, comprising at least two layers, wherein the at least two layers each comprise at least one layer forming material comprising at least one polymer and the at least two layers differ from each other with respect to the layer forming material, wherein the at least two layers are at least partly covalently and delamination free bonded to each other. The present invention relates furthermore to a method of production of the said membrane as well as to its use.

24 Claims, No Drawings

DELAMINATION FREE MEMBRANE

CROSS-REFERENCE TO RELATED APPLICATIONS

This application claims the benefit of U.S. Provisional Patent Application Ser. No. 61/425,890, filed Apr. 24, 2009.

FIELD OF THE INVENTION

The present invention relates to a membrane, particularly to a hollow fiber membrane, preferably delamination free and urea permeable, as well as its method of production and use, preferably for methods of blood purification, especially for hemodialysis and peritoneal dialysis.

PRIOR ART

Membranes, especially hollow fiber membranes, can be used in hemodialysis and peritoneal dialysis to enable the secretion of harmful metabolites like urea from the blood, in order to purify it. The membrane is used as semi-permeable barrier between the blood which has to be purified on the one side and the so-called dialysate on the other side. The purification of the blood is yielded by diffusion and also convection, which causes an exchange of substances between blood and dialysate.

Furthermore, membranes, in particular also hollow fiber membranes, find application in the treatment of dialysate, which also can occur during the dialysis process. During this treatment, especially urea is selectively removed out of the depleted dialysate. A so-called urea-selective hollow fiber membrane is used for this. Urea is transported across the membrane, and subsequently degraded by urease. At the same time, other important electrolytes for the organism, in particular mono- and divalent cations like $Na^+$, $K^+$, $Ca^{2+}$, or $Mg^{2+}$ are held back in the dialysate. It is known from prior art that such urea-selective membranes have a double-layered composition consisting of selection layer and support, respectively, carrier layer. From the prior art, double- and multi-layered membranes for blood dialysis are known, and are described, for example, in the applications U.S. Pat. No. 4,276,172, CA 2 707 818 A1, U.S. Pat. No. 4,164,437.

Double- or multi-layered membranes are also known by the person skilled in the art as composite membranes. The production of these double- or multi-layered membranes which are mostly designed as flat membranes, is carried out by a consecutive application of the layers on an already provided solid carrier layer. This is, for example, known from U.S. Pat. No. 5,156,740, EP 0 286 091 B1, or EP 0 359 834 B1.

The manufacture of hollow fiber membranes is carried out with so-called hollow fiber nozzles, which contain a central bore and one or more concentric annual channels arranged around the central bore. Dissolved polymers or adequate polymer mixtures are extruded using the outer concentric channels. The lumen of the hollow fiber is generated by an agent which is pressed through the central bore channel of the nozzle. The respectively used nozzle construction has to be adjusted depending upon the geometry of the fiber and the properties of the used polymers in order to provide symmetrical fibers having a consistent wall thickness. In this stage, the used polymers are called spinning mass. Such a spinning nozzle is, for example, known from U.S. Pat. No. 7,393,195. Several spinning methods are distinguished from each other, like, for example the phase inversion method, the dry-wet spinning method, or the melt spinning method, which are all known by the person skilled in the art from the prior art (M. Mulder, Basic Principals of Membrane Technology, Second Edition, Kluwer, 1996, pages 71 to 91).

A delamination of the layers can occur in composite membranes, in particular in composite hollow fiber membranes, which are produced by coextrusion. The delamination of the layers causes the separation, respectively delamination, of the layers and therefore the loss of function of the membrane. Particularly, where in case if the layers of a composite membrane consist of different polymers, a delamination of the layers can occur, as only weak interactions are present between the adjacent layers. Therefore, no effective adhesion of the layers can be guaranteed. This problem can be solved by using identical polymers and similar polymer concentrations. As the maximal achievable cross-over of compounds (Stoffübergang) of such a membrane depends also on the material of the support layer, it is particularly preferable, for performance optimization, to be able to select the polymers of the support layer and the selection layer independently from each other. A special characteristic of composite membranes consisting of identical polymers is the absence of a visible interface between the layers. An interface between layers can be made visible using an electron microscope. This distinguishes composite membranes consisting of identical polymers from membranes having layers consisting of different polymers. The latter shows in electron microscopical exposures a conspicuously visible interface between the layers. Therefore, it can be concluded that only few to no interactions between the layers take place.

A delamination and thus, a loss of function can take place after days or weeks in multi-layered hollow fiber membranes depending on the selection of the material if the fibers are stocked in an aqueous medium. Therefore, the delamination is a big problem especially at hemo- and peritoneal dialysis.

OBJECT OF THE INVENTION

Therefore, it was an object of the present invention to provide a membrane, in particular a hollow fiber membrane, with at least two layers differing from each other in respect to the layer forming materials, and which are connected delamination free with each other.

SUMMARY OF THE INVENTION

According to the invention this is achieved by the teaching of the independent claims. Embodiments of the invention are the subject of dependent claims.

The object is solved by a membrane, which comprises at least two layers, wherein the at least two layers comprise at least one polymer each and differ from each other in respect to the layer forming materials. The at least two layers are at least partly covalently and delamination free bonded to each other.

The invention therefore relates to a membrane comprising at least two layers, wherein the at least two layers each comprise at least one layer forming material comprising at least one polymer and the at least two layers differ from each other with respect to the layer forming material,
characterized in that
the at least two layers are at least partly covalently and delamination free bonded to each other.

In one embodiment, the at least two layers are not separable using a differential pressure ≤3 bar, preferably ≤5 bar, preferably ≤7 bar.

In an further embodiment, the membrane comprises a selectivity of urea vis-à-vis sodium, without an annealing step, of 5 to 40, further preferred of 10 to 30, in particular of 5 to 20 and further preferred of 5 to 10. The selectivity of the membrane of urea vis-à-vis sodium can increase after the application of an annealing step up to 200 and more.

In a further embodiment, the at least two layers are coextruded layers.

In a further embodiment, at least one layer is (designed as) a selection layer.

In a further embodiment, the selection layer comprises at least one polymer which is selected from cellulose acetate, preferably a cellulose acetate with an acylation degree of 0.5 to 3, cellulose ester, and mixed esters thereof.

In a further embodiment, the selection layer comprises additionally at least one further additive.

In a further embodiment, the additive is an adhesion-promoting additive, which preferably comprises reactive groups, more preferably amino functional reactive groups.

In a further embodiment, the additive is selected from polyethylenimine or polyamine or mixtures thereof.

In a further embodiment, the selection layer comprises a layer thickness in the dry state of 30 nm to 50 μm, preferably of 30 nm to 200 nm.

In a further embodiment, at least one layer is (designed as) a support layer.

In a further embodiment, the support layer comprises at least one polymer which is selected from
 (a) polyimine, polysulfone, polyethersulfone, polyimide, polyetherimide, polyethylenimine, polyvinylpyrrolidone, polymethylmethacrylimide or mixtures thereof; or
 (b) sulfonated polysulfone, sulfonated polyethersulfone, sulfonated polyetherimide, sulfonated polymethylmethacrylimide or mixtures thereof; or
 (c) polyimine, polysulfone, polyethersulfone, polyimide, polyetherimide, polyethylenimine, polyvinylpyrrolidone, polymethylmethacrylimide and sulfonated polysulfone, sulfonated polyethersulfone, sulfonated polyetherimide, sulfonated polymethylmethacrylimide or mixtures thereof.

In a further embodiment, the support layer comprises at layer thickness in the dry state of 1 μm to 500 μm, preferably of 35 μm.

In a further embodiment, the membrane is (designed as) a hollow fiber membrane.

In a further embodiment, the hollow fiber membrane exhibits an average diameter of the lumen of from 20 μm to 500 μm, preferably of 200 μm.

In a further embodiment, the hollow fiber membrane comprises at least one layer which is (designed as) a selection layer and which comprises cellulose diacetate and polyethylenimine.

In a further embodiment, the hollow fiber membrane comprises at least one layer which is (designed as) a support layer and which comprises polyetherimide.

In a further embodiment, the hollow fiber membrane comprises at least one layer which is (designed as) a support layer, and which comprises polyethersulfon and polymethylmethacrylimide.

In a further embodiment, the hollow fiber membrane comprises at least one layer which is (designed as) a support layer, and which comprises polyethersulfone and sulfonated polyethersulfone.

In a further embodiment, the hollow fiber membrane comprises at least one layer which is (designed as) a support layer, and which comprises polyetherimide and polyvinylpyrrolidone.

In a further embodiment the membrane comprises three coextruded layers.

In a further embodiment, the at least a first layer comprises in the dry state a layer thickness of 30 nm to 50 μm, preferably of 30 nm to 200 nm, at least a second layer comprises in the dry state a layer thickness of 30 nm to 50 μm, preferably of 30 nm to 200 nm, and at least a third layer comprises in the dry state a layer thickness of 1 μm to 500 μm, preferably 35 μm.

In a further embodiment, the membrane comprises at least a first layer of cellulose diacetate.

In a further embodiment, the membrane comprises at least a second layer of cellulose diacetate and polyethylenimine.

In a further embodiment, the membrane comprises at least a third layer of polyetherimide.

In a further embodiment, the invention comprises a method for the production of a membrane comprising the following steps:
 Provision of at least a first clear spinning mass, comprising a material for at least the first layer;
 Provision of at least a second clear spinning mass, which differs from the first clear spinning mass, and comprising a material for at least the second layer;
 Coextrusion of the at least two spinning masses using a spinning nozzle, comprising a number of concentric rings according to the number of provided spinning masses, wherein at least the first ring is capable for the intake and/or extrusion of at least a first spinning mass and at least a second ring which is capable for the intake and/or extrusion of at least a second spinning mass which differs from the first spinning mass, wherein the at least two concentric rings are arranged around a central round channel, which is capable for the intake or extrusion or intake and extrusion of an agent, preferably a precipitation agent, preferably water, characterized in that the clear spinning masses comprise at least one polymer or a material which is able to react or at least a polymer and a material which is able to react, especially a material which is to chemically crosslink.

In one embodiment, the method for production of a membrane comprises at least a first spinning mass, which comprises at least one polymer, which is selected from the group cellulose acetate in particular a cellulose acetate having an acylation degree of 0.5 to 3, cellulose ester or mixed esters thereof or at least one polymer which is selected from the group of cellulose acetate, especially a cellulose acetate having an acylation degree of 0.5 to 3, cellulose ester, or mixed esters thereof and at least one further additive, preferably an adhesion-promoting amino functional additive, which is selected from the group of polyethylenimine or a polyamine or polyethlyenimine and a polyamine.

In one embodiment, the method for the production of a membrane comprises at least a second spinning mass, which comprises at least one polymer which is selected from
 polyimine, polysulfone, polyethersulfone, polyimide, polyetherimide, polyethylenimine, polyvinylpyrrolidone, polymethylmethacrylimide or mixtures thereof; or
 sulfonated polysulfone, sulfonated polyethersulfone, sulfonated polyetherimide, sulfonated polymethylmethacrylimide or mixtures thereof; or polyimine, polysulfone, polyethersulfone, polyimide, polyetherimide, polyethylenimine, polyvinylpyrrolidone, polymethylmethacrylimide and sulfonated polysulfone, sulfonated polyethersulfone, sulfonated polyvinylpyrrolidone, sulfonated polymethylmethacrylimide or mixtures thereof.

The invention further pertains to the use of the membrane described herein for peritoneal dialysis, in particular for the regeneration of the dialysate, for blood purification, in particular for hemodialysis, for reverse osmosis, for energy generation in osmotic power plants, for gas separation, for pervaporation, for nano-, ultra-, micro- or particle filtration.

DETAILED DESCRIPTION OF THE INVENTION

To solve the object of the present invention, a membrane is provided, as described below in detail, in particular a hollow fiber membrane, comprising at least two layers, wherein the at least two layers each comprise at least one layer forming material comprising at least one polymer and the at least two layers differ from each other with respect to the layer forming material. The at least two layers are at least partly covalently and delamination free bonded to each other.

The term "covalent" refers to a covalent bond, respectively interaction, through which the groups and/or elements which are able to form such a bond, respectively interaction, are connected with each other using atom bond, homopolar bond, $\sigma$-$\sigma$-interaction, $\sigma$-$\pi$-interaction, two-electron-to-center bond, single bond, double bond, triple bond, as well as combinations of these interactions, respectively bonds. The mentioned interactions, respectively bonds, can be polar, respectively can be polarized, or can be non-polar, respectively non-polarized.

The term "at least in parts covalent(ly)" refers to that besides covalent bonds, respectively interactions, other non-covalent interactions, respectively bonds, can be present.

The term "non-covalent" comprises that the groups and/or elements which are able to form a bond, respectively an interaction, are connected to each other preferably using ion pairs, hydrogen bridge-bonds, dipol-dipol interactions, charge-transfer interactions, $\pi$-$\pi$-electron interactions, cation-$\pi$-electron interactions, van-der-Waals interactions, and disperse interactions, hydrophobe (lipophile) interactions, complexations, preferably complexations of transition metal cations, as well as combinations of these interactions, respectively bonds.

In one embodiment up to 50% of the interactions, respectively bonds, are covalent.

In a further embodiment up to 70% of the interactions, respectively bonds, are covalent.

In a preferred embodiment up to 100% of the interactions, respectively bonds, are covalent.

The term "membrane" means a separation layer.

In one embodiment the membrane is designed as hollow fiber membrane.

The membrane according to the invention comprises at least two layers.

In one embodiment the membrane comprises between 2 and 10 layers.

In a further embodiment the membrane comprises 2, 3, 4, or 5 layers.

According to the invention the membrane comprises layers, wherein the layers each comprise at least one polymer and differ from each other with respect to their layer forming material. In one embodiment the layers are obtained independently from each other starting from different spinning masses.

In one embodiment the membrane is (designed as) a separation layer for liquids.

In another embodiment the membrane is (designed as) a separation layer for gases.

In another embodiment the membrane is (designed as) a separation layer for liquids and gases.

The term "layer(s)" means that this/these layer(s) show a three-dimensional broadening, wherein the broadening in one dimension is at least 50%, preferably at least 75%, preferably at least 90% smaller than the broadening in the other two dimensions. Layers can be built by any layer forming material.

The term "layer forming material" means all materials, for example polymers, which are comprised within the layer.

In one embodiment the layers comprise synthetic or natural polymers.

In one embodiment the layers comprise polymers, which are soluble in organic solvents, which are preferably at least partly miscible with water.

The term "soluble" comprises a clear, non-opaque, optical transparent solution in the visible wavelength region of light, which consists preferably at least macroscopically of one phase. In other words: No Tyndal-effect can be observed in the visible region of the light. This means macroscopically that the solution forms one phase and is free of undissolved components like, for example, polymer gel particles.

This definition is also relevant for the term "clear spinning solution" which is used later.

In one embodiment the layers each comprise at least one polymer, which is soluble in dimethyl acetamide, pyrrolidone, N-methylpyrrolidone, dimethyl sulfoxid, formamide, N-methyl formamide, primary alcohols, secondary alcohols, tertiary alcohols, dioxane, tetrahydrofurane or mixtures thereof.

In one embodiment the layers comprise in addition to the polymers preferrably up to 10 wt-%, preferably up to 5 wt-%, preferably up to 2 wt-% oligomers which preferably correspond to the polymers used, or preferably differ from the polymers used. Typically the oligomers comprise a polymerization degree of 2 to 10.

A first layer can be distinguished from a second layer by different chemical (for example permeability or material) and/or physical (for example the average distribution of the pore sizes) properties.

In one embodiment at least one layer is designed as a selection layer.

The term "selection layer" means that this layer is permeable for at least one selected compound, preferably urea or water, out of a compound mixture, preferably a liquid compound mixture, preferably blood or dialysate, or blood and dialysate.

The term "selection layer" furthermore means, that this layer has, at the same time, a reduced, preferably minimized permeability or is preferably impermeable for other compounds, preferably for mono- and divalent cations, preferably for mono- and divalent cations of the first and second main group of the periodical system of chemical elements, like, for example, sodium as $Na^+$, potassium as $K^+$, magnesium as $Mg^{2+}$, calcium as $Ca^{2+}$, as well as their water complexes which exist in aqueous milieu like, for example, in blood or dialysate.

In one embodiment the selection layer comprises at least one polymer.

In one embodiment the selection layer comprises at least one polymer which is selected from cellulose acetate, especially a cellulose acetate having an acylation degree of 0.5 to 3, which means, for example, a cellulose di-acetate, or a cellulose tri-acetate; cellulose ester, or mixed esters thereof.

The term "acylation degree" is the averaged number of acyl groups per structure unit. In one embodiment, an acylation degree in the range of 2.5 to 3, for example 2,7, is used.

In a further embodiment the selection layer comprises a polyamide, which can also be a crosslinked polyamide. It is possible to spin an uncrosslinked precursor and subsequently crosslink the spun material.

In one embodiment the selection layer is preferably at the side of the lumen, which means at the inner side, which means that the selection layer forms the inner layer of the membrane which is designed in this embodiment as a hollow fiber membrane.

In a further embodiment the selection layer is arranged outside, which means that the selection layer forms the outer layer of the membrane, which is designed as a hollow fiber membrane in this embodiment.

In one embodiment at least one layer is (designed as) a carrier layer.

The term support layer is synonym to the term carrier layer. The term "support layer" refers to a layer which is characterized by a high porosity and a high mechanical stability, preferably a high mechanical stability in the sense of resistance to denting and tensile strength. The carrier, respectively support layer, comprises at least one polymer, which is preferably selected from:
a) polyimine, polysulfone, polyethersulfone, polyetherimide, polyethylenimine, polyvinylpyrrolidone, polymethylmethacrylimide, or mixtures thereof; or
b) sulfonated polysulfone, sulfonated polyethersulfone, sulfonated polyetherimide, sulfonated polymethylmethacrylimide, or mixtures thereof; or
c) polyimine, polysulfone, polyethersulfone, polyetherimide, polyethylenimine, polyvinylpyrrolidone, polymethylmethacrylimid and sulfonated polyimine, sulfonated polysulfone, sulfonated polyethersulfone, sulfonated polymethylmethacrylimide, or mixtures thereof.

Polyimides which might be used are known under the tradename Ultem 1000, Matrimid, or Pleximid.

In one embodiment the carrier layer is arranged preferably outwardly, which means that it forms the outer side of the membrane which is (designed as) a hollow fiber membrane in this embodiment.

In a further embodiment the carrier layer is arranged at the lumen side, respectively arranged inwardly, which means that it forms the inner layer of the membrane, which is designed as hollow fiber membrane in this embodiment.

In one embodiment one layer, preferably the selection layer, exhibits a layer thickness of preferably 30 nm to 50 µm, preferably of 30 nm and 200 nm, which is preferably determined in the dry state.

In one embodiment one layer, preferably the support, respectively the carrier layer, exhibits preferably a layer thickness of preferably 1 µm to 500 µm, preferably of 35 µm, wherein the layer thickness is preferably determined in the dry state.

The drying of the fibers for the determination of the layer thickness occurs in one embodiment in two successive drying chambers at temperatures of 120° C.±5° C.

The layer thickness is determined in one embodiment by using an electron microscope in high vacuum after finishing the drying step.

According to the invention it is essential that the layers which are connected delamination free are designed during the production process in such a way that they are able to react with each other. Thus, if an adhesion-promoting additive is used, this additive can be added to the mixture for the production of the carrier layer or to the mixture for the production of the selection layer. The adhesion-promoting additive can also be comprised in an adhesion-promoting layer, which can be arranged between the selection layer and the carrier support layer.

The term "delamination free" means that the at least two layers are firmly bonded. This means that the two layers are connected to each other by atomar and/or molecular forces and cannot be separated from each other without being destroyed. Thus a delamination of the layers is reduced, preferably minimized, and is further preferably prevented. This is caused by covalent and/or non-covalent interactions and/or bonds between the at least two layers.

In one embodiment, this is achieved such that at least one layer, preferably the layer which is designed as selection layer, comprises at least one polymer and additionally at least one additive.

In a further embodiment at least one layer, preferably the selection layer, comprises at least one polymer which is selected from cellulose acetate, especially a cellulose acetate having an acylation degree between 0.5 and 3, which means, for example, also cellulose diacetate or cellulose triacetate; cellulose ester; cellulose diacetate, and/or mixed esters thereof, and, additionally, at least one additive.

In one embodiment the additive is (designed as) an adhesion-promoting additive.

In one embodiment the adhesion-promoting additive is amino-functional.

In one embodiment the additive comprises a material which comprises reactive groups.

In one embodiment the additive comprises at least one polymer, which comprises reactive groups, and which is selected from polyethylenimine, polyamine, amine containing copolymeres, polyvinylamine, poly-L-lysine or mixtures thereof.

Polyamines which might be used are known under the tradenames Epomin or Polyment (Nippon Shokubai), Lupasol (BASF) or Jeffamin (Huntsmann). polyvinylamine can, for example, be purchased from BASF.

In one embodiment also low-molecular polymers comprising reactive groups can be comprised in the additive, like, for example, oligoamines.

In one embodiment the additive comprises at least one polymer which is soluble in organic solvents.

In one embodiment the additive comprises at least one polymer which is soluble in organic solvents which are preferably at least in parts miscible with water. The organic solvents are preferably selected from dimethylacetamide, pyrrolidone, N-methylpyrrolidone, dimethylsulfoxide, formamide, N-methylformamide, dimethylformamide, primary alcohols, secondary alcohols, tertiary alcohols, dioxane, tetrahydrofurane or mixtures thereof.

The term "reactive groups" comprises all functional groups and/or elements which are able to form with other reactive groups, respectively elements of the same material, but preferably with reactive groups and/or elements of at least a second material, preferably a second polymer, covalent or non-covalent or covalent and non-covalent bonds, respectively interactions.

In one embodiment the additive is selected in such a way that preferably covalent bonds, respectively interactions, between the at least two layers can be built.

To build these bonds, respectively interactions, all reactions known by the person skilled in the art can be used.

In one embodiment these reactions are condensation reactions, especially esterifications and amidation reactions.

The term "hollow fiber membrane" can be interchangeably used with hollow fiber capillary membrane. Such a hollow fiber capillary membrane comprises preferably an averaged diameter of the lumen between 20 µm to 500 µm, preferably 200 µm.

In one embodiment, the external schematic cross-section of the hollow fiber membrane is round, respectively circular.

But also other geometrical figures of the schematic cross-section of the hollow fiber membrane are possible. For example, star-like figures or figures with alternating convex-like and concave-like elements, which can be made when preferably the surface of the hollow fiber membrane is increased.

In one embodiment the membrane comprises at least three layers and is designed as hollow fiber membrane in this embodiment. The at least three layers are connected to the each neighbored layer, which means the layers with direct contact to each other (thus a first layer with a second layer, and this second layer with a third layer) are connected to each other by covalent or non-covalent or covalent and non-covalent bonds, respectively interactions. Preferably they are connected to each other delamination free.

In one embodiment the layer thickness of the layer which is designed as selection layer is 30 nm to 50 µm, preferably 30 nm to 200 nm in the dry state.

In one embodiment the layer thickness of the second layer, preferably the middle layer, is, in the dry state, 20 nm to 200 µm, preferably 30 nm to 50 µm, further preferred 30 nm to 200 nm.

In one embodiment the layer thickness of a third layer which is preferably designed as carrier layer in the dry state is 1 µm to 500 µm, preferably 20 µm to 200 µm, particularly 25 to 100 µm, further preferred 25 to 35 µm, especially 35 µm.

In one embodiment of a membrane which is (designed as) a hollow fiber membrane a first layer, preferably the inner layer (selection layer) comprises a polymer which is selected from cellulose acetate, in particular a cellulose acetate having an acylation degree of between 0.5 and 3, cellulose ester, cellulose diacetate and/or mixed esters. In particular, this first layer, preferably the inner layer, is designed as selection layer which comprises particularly preferred cellulose acetate.

In one embodiment of a membrane, which is designed as hollow fiber membrane, a second layer, preferably the middle layer, comprises at least one polymer which is selected from cellulose acetate, especially a cellulose acetate having an acylation degree of between 0.5 and 3, cellulose ester, cellulose diacetate and/or a mixed ester thereof as well as an additive, preferably an adhesion-promoting additive, which is preferably aminofunctional, and preferably selected from polyethylenimine and/or a polyamine, especially a polymer, which comprises reactive groups and/or elements.

Previous definitions of additive and reactive groups and/or elements are also valid here.

In one embodiment of a membrane, which is (designed as) a hollow fiber membrane, the second layer, preferably the middle layer, comprises cellulose diacetate and polyethylenimine. Preferably, the second layer, preferably the middle layer, is designed as selection layer.

In one embodiment of the membrane, which is (designed as) a hollow fiber membrane, a third layer, preferably the outer layer, comprises at least one polymer which is selected from polyimine, polyimide, polysulfone, polyethersulfone, polyetherimide, polyethylenimine, polyvinyl pyrrolidone, polymethylmethacrylimide, polyethersulfone or mixtures thereof, which are sulfonated and/or non-sulfonated, respectively containing sulfonated and/or non-sulfonated groups. Preferably, this third layer, preferably the outer layer, is defined as carrier, respectively, support layer. Preferably this third layer, preferably the outer layer, comprises polyether imide.

According to the invention the method for production of the membrane may comprise the following steps:

Provision of at least a first clear spinning mass comprising a material for at least the first layer;

Provision of at least a second clear spinning mass, which differs from the first clear spinning mass, and comprises a material for at least the second layer;

Coextrusion of the at least two spinning masses using a spinning nozzle comprising a number of concentric rings corresponding to the number of provided spinning masses wherein at least a first ring is capable for the intake and/or extrusion of at least a first spinning mass, and at least a second ring is capable for the intake and/or extrusion of at least a second spinning mass, which differs from the first spinning mass. The at least two concentric rings are arranged around a central round channel which is capable for the intake or extrusion or intake and extrusion of an agent, preferably a precipitation agent, which is preferably water;

Provision of a rinsing bath which is enabled to reduce, preferably to minimize, the content of the solvent(s) used, which is/are contained in previously yielded membrane. It is further preferred that the rinsing bath is capable of removing the solvent(s) used completely.

In one embodiment the method for the production comprises additionally the following step which can be subsequently conducted:

Drying of the previously yielded and treated membrane or hollow fiber comprising this membrane.

The clear spinning solution comprises at least one polymer which is preferably selected from:

the group of cellulose acetate, especially a cellulose acetate having an acylation degree between 0.5 and 3, cellulose ester, cellulose diacetate, or mixed esters thereof; or the group of polyethylenimine, polyamine, polyvinylamine, amine containing copolymers, poly-L-lysine, oligoamine or mixtures thereof; or the group of polyimide, polyimine, polysulfone, polyethersulfone, polyetherimide, polyethylenimine, polyvinylpyrrolidone, polymethylmethacrylimide, polyethersulfone and/or sulfonated, respectively, non-sulfonated derivatives thereof;

as well as mixtures of previously mentioned polymers.

In one embodiment the spinning mass comprises at least one solvent which is capable of dissolving the previously mentioned polymers and, thus, generating a clear spinning mass.

In one embodiment the spinning mass comprises an organic solvent, which is preferably at least partly miscible with water, preferably selected from dimethylacetamide, pyrrolidone, N-methylpyrrolidone, dimethylsulfoxide, formamide, N-methylformamide, primary alcohols, secondary alcohols, tertiary alcohols, dioxane, tetrahydrofurane, or mixtures thereof.

In one embodiment the method for the production comprises the step that at least a first spinning mass can contact at least a second spinning mass. This preferably happens via coextrusion of a first spinning mass coinstantaneously with at least a second spinning mass using preferably a provided spinning nozzle. Preferably a hollow fiber nozzle is used as spinning nozzle. The previously described spinning masses are thereby extruded using one or more concentric arranged ring channels whereas coinstantaneously a liquid or viscous agent is pressed through the centrally arranged round channel. This agent is preferably water and induces the precipitation reaction at the phase inversion method. Furthermore, a step is comprised where the solvent used is removed from the said membrane, respectively hollow fiber membrane using a washing process. Subsequently to this washing step a drying of the so-obtained and washed membrane, respectively, hollow fiber membrane is conducted. The drying process occurs preferably in a hot-air flow. Preferably, at least one previously described spinning mass comprises a material, respectively a polymer, which is capable of forming a selection layer as previously defined. Furthermore, preferably at least a second spinning mass comprises preferably a material, respectively polymer, which is capable of forming a carrier, respectively support layer. The term spinning solution can be used interchangeably to the term spinning mass. Preferred methods of production of said membrane, respectively said hollow fiber membrane, are spinning methods, particularly preferred the phase inversion method, the dry-wet-spinning method or melt-spinning method.

According to the invention also the use of a membrane, respectively the hollow fiber membrane, is envisaged. The membrane, respectively the hollow fiber membrane, according to the invention comprising at least two layers, characterized in that the at least two layers are connected covalently and/or non-covalently with each other, preferably are connected delamination free with each other, can be used for methods of peritoneal dialysis, especially for methods for regeneration of the dialysate, for methods of blood purification, especially hemodialysis, for methods reverse osmosis, for methods of energy generation in osmotic power plants, as well as for methods of gas separation, pervaporation and in nano-, ultra-, micro- and particle-filtration.

Determination of the Delamination Strength of a Membrane

As the delamination can occur timely delayed to the production of a multi-layered membrane, especially a hollow fiber membrane with coinstantaneously extruded layers, an analysis method for the determination of the delamination strength of a membrane is necessary. Such a method is described in the following. Small modules are produced comprising approximately 10 cm long single fiber. The fibers are initially filled with water at the inner side and then are hydrophilized from the outer side for approximately 10 s using a solution of 50% isopropanol in water. After the alcohol is completely removed the fiber is stored in water a 85° C. over night. If necessary, the time can also be extended. Afterwards, the hollow fiber is permanently flushed with water from the lumen side at room temperature, in such a way that a conspicuous water outlet can be observed. Hereupon a water pressure is applied to the outer side of the fiber. The water pressure is determined using a manometer. The applied pressure is a static pressure which has the same value at every point of the fiber. The pressure is increased slowly until no water outlet from the lumen side can be observed any more. At this limit pressure the inner layer is either collapsed due to the outer pressure or the hollow fiber is compressed, thus the flow through in the lumen is suppressed. If the fiber is cross-cut and then analyzed using a light-microscope it can be determined which of the both situations have happened.

The following Table 1 shows the results of the delamination tests for the fibers of the different examples.

TABLE 1

| Fiber from Example | Maximum applied Pressure [bar] | Delamination of the Inner Layer | Remarks |
|---|---|---|---|
| 1 | <1 | Yes | Fiber delaminates when stored in the wet |
| 3 | 6 | No | |
| 4 | 2 | No | |
| 5 | 7 | Yes | |
| 6 | 3 | No | |

The results show that the membrane according to the invention, having covalent or covalent and non-covalent interactions between the layers, have a multiple increased stability against delamination in contrast to the reference fiber from Example 1. Preferably, the layers of the membrane according to the invention cannot be separated from each other at a pressure of up to 3 bar, preferably of up to 5 bar, preferably of up to 7 bar, which means they are delamination free.

In one embodiment the previously mentioned pressure is designed as applied outer pressure which is applied to the membrane.

Measurement of the Cation Retention and Urea Permeability

For the characterization of a membrane, especially a hollow fiber membrane comprising a cellulose acetate layer, the transfer of cations, especially of $Na^+$, $Ca^{2+}$, $K^+$ or $Mg^{2+}$ or combinations thereof, and urea are measured and compared to each other. For this purpose the lumen side of the fiber of a hollow fiber membrane is flowed through once with a solution consisting of 226 mM glucose, 2.5 mM $CaCl_2$, 141 mM NaCl and 25 mM urea in water having a flow of 50 ml/min. The side of the dialysate contains a defined volume of 550 ml of an isosmotic glucose solution in water. This volume is locked pressure-tight, in order to maintain a constant volume at the dialysate side during the duration of the test. The solution is circulated with a flow of 1000 ml/min. The test is conducted at room temperature.

The change of concentrations for sodium cations, calcium cations and urea at the side of the dialysate of the hollow fiber membrane are now determined time dependently. The removed liquid volume during sample taking is replaced by an equally big volume of a massive stamp, which is screwed into the liquid reservoir.

The concentrations can be determined using known analysis devices like Cobas Integra 400 of Roche.

The transport parameters of the membrane can be calculated from the concentrations at the beginning and the change of the concentrations during the test.

The permeability of the membranes according to the invention for sodium, which is determined in the described way, is preferably 20-30 $mmol/m^2d$. The permeabilities for urea are preferably 20-30 $g/m^2d$. The values can be also higher or lower.

To calculate the above-mentioned values from the measured data, a urea gradient of 0.86 g/l and a sodium gradient of 140 nM across the membrane is assumed.

All data ranges contained in this application are meant including the mentioned data limits.

In the following examples the invention is explained in more detail. All presented concentration data are meant as weight percent [w/w]. The viscosities of the solutions were determined using a Haake VT550 Rotation Viscosimeter at a temperature of 40° C.

EXAMPLES

Example 1

Reference Experiment Without Fixing of the Layers

An inner, lumen-side oriented polymer solution and an outer polymer solution were extruded using two concentric arranged channels of a spinning nozzle. The water for precipitation of the polymer solutions was supplied using a centrally arranged round channel. The spinning mass for the carrier layer which builds here the outer layer, consisted of 20% Udel 3500 polysulfon and 5% polyvinylpyrrolidon K90 as well as 1% water and was dissolved in dimethylacetamide under stirring. The viscosity of the solution was about 11500 mPas. The spinning mass for the selection layer, which builds here the inner layer, consisted of 30% cellulose dicacetate having a molecular weight of 29 kD and an acetyl content of 40% (#2218, Sigma/Aldrich) and was dissolved in dimethylacetamide p.a. under stirring. The viscosity of this solution was about 15200 mPas. The temperature of the nozzle block was 20° C. The extruded hollow fiber passed an air gap of 250 mm prior to emerging in a water filled precipitation bath having a temperature of 42° C. A rinsing bath followed having a temperature of 75° C. The fresh water supply of the connected bathes occurred with 2.6 l/m. The hollow fiber was subsequently dried at 95° C. The take-up speed of the fiber was 250 mm/s. The dried fiber was spuled. A bundle of the hollow fiber consisted of 2300 fibers having a total area of 0.4 m². The inner diameter of the fiber was 200 µm. The outer diameter of the fiber was 261 µm. The thickness of the dry inner layer was averagely at 500 nm. The resulting fiber comprised a selectivity of urea vis-à-vis mono- and divalent cations. To control the adhesion of inner and outer layer, a pressure difference directed from the outer side to the inner side was applied to the membrane which was stored in aqueous medium. The pressure limit which causes the delimitation of the inner layer from the outer layer was determined. The result is shown in Table 1.

Example 2

Production of a Spinning Mass for the Inner Polymer Layer

A polymer solution comprising cellulose diacetate [Sigma/Aldrich #22188] in dimethylacetamide p.a. (DMAc) was adjusted using a polyethylenimine solution of 0.044 g/ml (Sigma/Aldrich #40,872-7; $M_n$=10000 g/mol) in DMAc to a concentration of 30% cellulose acetate and 0.1% polyethylenimine. The required mass of the polyethylenimine solution (0.044 g/ml in DMAc) was quickly added under stirring to a cellulose acetate solution. Subsequently the mixture was stirred for 30 min at 45° C. preferably free from air bubbles. Afterwards the solution was diluted 1:1 (w/w) using DMAc p.a. and stirred for further 30 min. A homogeneous solution was yielded. The viscosity of the solution increased due to the addition of polyethylenimine solution. The resulting spinning mass was clear and showed a slight yellowish color. The viscosity of the diluted solution was between 600 and 800 mPas. Polyethylenimine can of course be substituted by other amines and polyamines as long as the resulting mixture with cellulose ester results in the formation of a clear spinning mass. Furthermore, if polyethylenimine is substituted by other amines or polyamines it is necessary that after the reaction with the cellulose ester enough free amino groups remain to ensure the interaction with one component of the outer mass.

Example 3

Spinning of a Two-Layered Hollow Fiber Membrane Comprising a Polyimide/Polyethylenimine System The spinning mass of the selection layer, which forms here the inner layer, has been produced according to Example 2 and consisted of 15% cellulose diacetate (Sigma/Aldrich #22188) and 0.05% polyethylenimine (Sigma/Aldrich #40,872-7; $M_n$=10000 g/mol) in dimethyl acetamide p.a. The polymer mixture is also clear at higher polymer concentration of 29% cellulose diacetate with 0.2% polyethylenimine. The relative proportions of both polymers can be free chosen basically, as long as a clear spinning mass results. This resulting clear spinning mass has to be textile with regard to its viscosity and has to form a selective layer against cations with coexisting urea permeability according to the invention. The spinning mass of the support layer, which builds here the outer layer, consisted of a solution of 20% polyetherimide (Ultem 1000) in DMAc p.a. The support layer of the fiber is therefore hydrophobic and needs to be hydrophilized prior to use. It is self-evident that such a layer can also be obtained in hydrophilic form through the use of further additives. Thus, a mixture of 17.5% polyetherimide with 2.5% polyvinylpyrrolidone yields a hydrophilic adhesive support layer. The spinning masses were extruded using a hollow fiber spinning nozzle having two concentric arranged mass channels. Through a central arranged channel of the hollow fiber spinning nozzle water was pressed out and filled the lumen of the fiber. Thus, the phase separation of the spinning masses was obtained. The temperature of the spinning block was adjusted to 5° C. The fiber passed an air gap of 50 mm after exiting the block. The take-up speed was 250 mm/s. The temperature of the water filled precipitation bath was 20° C. The subsequently following rinsing bath was adjusted to have a temperature gradient of 20° C. to 60° C. It is necessary to keep attention that the solvent is sufficiently removed from the fiber. Otherwise strand breaks may happen during the drying in the drying arrangement or a fiber with insufficient performance is obtained. The drying of the fiber occurred at 120 to 130° C. Subsequent to the drying of the fiber the thickness of the selection layer was 100 nm, and the thickness of the support layer of the fiber was about 35 µm. The lumen cross section was 200 µm.

The fibers were collected to form bundles and further processed to form dialyse modules. Prior to characterization of the fiber the lumen side of a dialyse module was filled with water and hydrophilized from the outer side for about 10 s using a 50% isopropanol/water mixture. Afterwards a warmth treatment at 90° C. over night was carried out in the water filled module. This procedure is known by the person skilled in the art under the term "annealing". After that the sodium-, calcium- and urea-permeability of the fiber was determined. Typical values were 23-30 g/m²d for urea and 23-32 mmol/m²d for sodium. The calcium permeability was below the detection limit at a concentration difference of 2.5 mM across the membrane. To test the adhesion properties of support- and selection layer a differential pressure directed from the outer side to the inner side was applied to the water stored membrane. The pressure limit, at which the delamination of the selection layer from the support layer occurred was determined. The result is shown in previous Table 1.

Example 4

Spinning of a Two-Layered Hollow Fiber Membrane Comprising a Polyimide/Polyethylenimine/PMMI/Polyethersulfone System The spinning mass for the selection layer produced according to Example 2 is used. The selection layer forms here the inner layer. The production was carried out according to Example 2 without the described diluting step. The spinning mass consists of 30% cellulose diacetate (Sigma/Aldrich #22188) and 0.1% polyethylenimine (Sigma/Aldrich #40,872-7; $M_n$=10000 g/mol) in dimethylacetamide p.a.

The spinning mass of the selection layer which forms here the outer layer consists of a mixture of polyethersulfone (Radel A-100) and polymethylmethacrylimide (PMMI) known under the tradename Pleximid. A mixture of 20% polyethersulfone and 2% Pleximid in dimethylacetamide yielded a clear spinning mass having a viscosity of 814 mPas measured at 40° C. A pure Pleximid mass cannot be textiled due to the too low molecular weight of the polymer. The low molecular weight of the Pleximid might be the reason for the relatively good miscibility with polyethersulfone. A complete miscibility is not possible. The spinning masses were extruded using a hollow fiber spinning nozzle having two concentric arranged mass channels. Water was pressed out of a centrally arranged channel of the hollow fiber spinning nozzle and filled the lumen of the fiber. Thus, a phase separation of the spinning masses is obtained.

The spinning conditions were chosen analogue to the conditions of Example 3.

The fiber obtained showed a selectivity against mono- and divalent cations and also showed a urea permeability The selection layer adhered in the pressure load test.

Example 5

Spinning of a Two-Layered Hollow Fiber Membrane Comprising a System of Charged Polymers The spinning mass of the selection layer which forms here the inner layer has been produced according to Example 2 without the described dilution step. The spinning mass for the selection layer consisted of 30% cellulose diacetate (Sigma/Aldrich #22188) and 0.1% polyethylenimine (Sigma/Aldrich #40,872-7; $M_n$=10000 g/mol) in dimethylacetamide p.a. The spinning mass of the support layer which forms here the outer layer consisted of 20% polyethersulfone and 4% sulfonated polyethersulfone. The solvent mixture used for the spinning mass of the selection layer consisted of dimethylacetamide and pyrrolidone in the ratio 1:1. The degree of sulfonation of the polyethersulfone has to be chosen such that no water solubility is obtained. The spinning masses were extruded using a hollow fiber spinning nozzle having two concentric arranged mass channels. Water was pressed out of a centrally arranged channel of the hollow fiber spinning nozzle and filled the lumen of the fiber. Thus, the phase separation of the spinning masses was yielded. The temperature of the spinning block was adjusted to 20° C. The fiber passed an air gap of 200 mm after exiting the block. The take-up speed was 250 mm/s. The temperature of the water filled precipitation bath was 40° C. The subsequently following rinsing bath had a temperature of 70° C. It has to be paid attention, that the solvent is sufficiently removed from the fiber as fiber breaks may otherwise occur during drying or a fiber having an insufficient performance may be obtained. The drying of the fiber occurred at 90° C. After the drying of the fiber the thickness of the selection layer was 500 nm and the thickness of the support layer of the fiber was about 40 µm. The diameter of the lumen was 203 µm. The fibers were collected to form bundles and further processed to form dialyse modules. Prior to characterization of the fiber the lumen side of the dialyse module was filled with water and hydrophilized from the outer side for about 10 s using a 50% isopropanol/water mixture. The so obtained membranes showed a selectivity vis-à-vis mono- and divalent cations, typically between 5 and 20, without having been subjected to a prior annealing step. The membranes were permeable for urea. To examine the adhesion of selection and support layer a differential pressure directed from the outer side to the inner side was applied to the wetly stored membrane. The pressure limit at which the delamination of the inner layer from the outer layer occurred was determined. The results are shown in previous Table 1.

Example 6

Spinning of a Three-Layered Membrane Comprising a Polyimide/Polyethylenimine System The spinning mass of the selection layer, which forms here the inner layer, consisted of a solution of 15% cellulose diacetate (Sigma/Aldrich #22188) in dimethylacetamide. The spinning mass of the adhesion-promoting middle layer produced according to Example 2 consisted of 15% cellulose diacetate (Sigma/Aldrich #22188) and 0.05% polyethylenimine (Sigma/Aldrich #40,872-7; $M_n$=10000 g/mol) in dimethylacetamide p.a. The spinning mass of the support layer, which forms here the outer layer, consisted of polyetherimide (Ultem 1000) which has been dissolved with 20% in DMAc. The three spinning masses were extruded using a hollow fiber spinning nozzle consisting of three concentrically arranged channels. Water was pressed out of a centrally arranged channel and filled the lumen of the fiber. Thus, the phase separation of the three spinning masses was induced. The temperature of the spinning block was 10° C. The fiber passed an air gap of 50 mm after exiting the spinning block. The take-up speed was 250 mm/s. The temperature of the water filled precipitation bath was 16° C. The subsequently following rinsing bath had a temperature gradient of 20° C. to 60° C. Attention has to be paid that the solvent is sufficiently removed from the fiber as otherwise fiber breaks during the drying step may occur or a fiber may be obtained having an insufficient performance. The drying of the fiber occurred at 120 to 130° C. After drying the fiber the thickness of the selection layer was about 60 nm, the thickness of the adhesion-promoting middle layer was about 40 nm and the thickness of the support layer of the fiber was about 35 µm. The diameter of the lumen was 170 µm. The adhesion-promoting middle layer and the selection layer cannot be differentiated using electron microscopy. The relative layer thicknesses were yielded from the measured flows of both spinning masses. The fibers were collected in order to form bundles and further processed to form dialyse modules. Prior to characterization of the fiber the lumen side of the dialyse module was filled with water and hydrophilized from the outer side for about 10 s using a 50% isopropanol/water mixture. Afterwards, a warmth treatment at 90° C. overnight took place in a water filled module. This is known by the person skilled in the art as "annealing". Thus, the permeability for sodium, calcium and urea of the fiber is determined. Typical values for urea were 23-30 g/m²d and for sodium 23-32 mmol/m²d. The permeability for calcium was below the detection limit at a concentration difference of 2.5 mM across the membrane. To examine the adhesion of the layers a differential pressure directed from the outer side to the inner side was applied to the wetly stored membrane. The pressure limit causing the delamination of the layers was determined. The result is shown in previous Table 1.

The invention claimed is:

1. A membrane comprising:
    at least two layers, wherein each layer is or comprises a layer forming material, wherein a first layer of the at least two layers is a selection layer and a second layer of the at least two layers is a support layer,
        wherein the selection layer comprises at least one polymer which is selected from cellulose acetate, cellulose ester and mixed esters thereof;
        wherein the support layer comprises at least one polymer which is selected from polysulfone, polyethersulfone, polyimide, polyetherimide, polymethylmethacrylimide, or mixtures thereof, or a mixture of polyvinylpyrrolidone and polysulfone, polyethersulfone, polyimide, polyetherimide, or polymethylmethacrylimide, and
    one or more layers of the at least two layers further comprise at least one adhesion promoting additive, wherein the at least one adhesion promoting additive comprises aminofunctional reactive groups,
    wherein the at least two layers are at least partly covalently and delamination free bonded to each other via the at least one adhesion promoting additive.

2. The membrane according to claim 1, wherein the at least two layers of the membrane are not separable using a differential pressure of up to 3 bar.

3. The membrane according to claim 1, wherein the membrane comprises a selectivity of urea vis-à-vis sodium, without an annealing step, of 5 to 10.

4. The membrane according to claim 1, wherein the at least two layers are coextruded layers.

5. The membrane according to claim 1, wherein the additive is selected from polyethylenimine or polyamine or mixtures thereof.

6. The membrane according to claim 1, wherein the selection layer comprises a layer thickness in the dry state of 30 nm to 50 µm.

7. The membrane according to claim 1, wherein the support layer comprises a layer thickness in the dry state of 1 µm to 500 µm.

8. The membrane according to claim 1, wherein the membrane is a hollow fiber membrane.

9. The membrane according to claim 8, wherein the hollow fiber membrane exhibits an average diameter of the lumen of 20 µm to 500 µm.

10. The membrane according to claim 8, wherein the hollow fiber membrane support layer comprises polyetherimide.

11. The membrane according to claim 8, wherein the hollow fiber membrane support layer comprises polyethersulfone and polymethylmethacrylimide.

12. The membrane according to claim 8, wherein the hollow fiber membrane comprises at least one layer which is a support layer, and which comprises polyethersulfone and sulfonated polyethersulfone.

13. The membrane according to claim 1, wherein the hollow fiber membrane support layer comprises polyetherimide and polyvinylpyrrolidone.

14. The membrane according to claim 1, wherein the membrane comprises three coextruded layers.

15. The membrane according to claim 14, wherein at least a first layer comprises in the dry state a layer thickness of 30 nm to 50 µm, at least a second layer comprises in the dry state a layer thickness of 30 nm to 50 µm, and at least a third layer comprises in the dry state a layer thickness of 1 µm to 500 µm.

16. The membrane according to claim 14, wherein at least a first layer comprises cellulose diacetate.

17. The membrane according to claim 14, wherein at least a second layer comprises cellulose diacetate and polyethylenimine.

18. The membrane according to claim 14, wherein at least a third layer comprises polyetherimide.

19. A method for the production of the membrane of claim 1, the method comprising steps of:
    providing at least two clear spinning masses,
        a first clear spinning mass comprising at least one polymer which is selected from cellulose acetate, cellulose ester and mixed esters thereof, and
        a second clear spinning mass comprising at least one polymer which is selected from polysulfone, polyethersulfone, polyimide, polyetherimide, polymethylmethacrylimide, or mixtures thereof, or a mixture of polyvinylpyrrolidone and polysulfone, polyethersulfone, polyimide, polyetherimide, or polymethylmethacrylimide; and
    coextruding the at least two spinning masses using a spinning nozzle comprising at least two concentric rings, wherein a number of concentric rings accords to a number of provided spinning masses, wherein the at least two concentric rings are arranged around a central round channel, which is capable for the intake or extrusion or intake and extrusion of an agent,
    wherein the at least two clear spinning masses are characterized in that when they are coextruded they react and/or chemically crosslink to form the membrane.

20. The method according to claim 19, wherein at least a first spinning mass comprises cellulose acetate having an acylation degree of 0.5 to 3.

21. The method according to claim 19, wherein at least a second spinning mass comprises at least one polymer which is selected from
    sulfonated polysulfone, sulfonated polyethersulfone, sulfonated polyetherimide, sulfonated polymethylmethacrylimide or mixtures thereof; or
    polysulfone, polyethersulfone, polyimide, polyetherimide, polymethylmethacrylimide and sulfonated polysulfone, sulfonated polyethersulfone, sulfonated polymethylmethacrylimide or mixtures thereof.

22. A method, comprising steps of:
    providing the membrane of claim 1; and
        performing peritoneal dialysis using the membrane in particular for the regeneration of the dialysate, for blood purification, in particular for hemodialysis, for reverse osmosis, for energy generation in osmotic power plants, for gas separation, for pervaporation, for nano-, ultra-micro-, or particle filtration.

23. The membrane according to claim 1, wherein the support layer comprises at least one polymer which is selected from
- (a) sulfonated polysulfone, sulfonated polyethersulfone, sulfonated polyetherimide, sulfonated polymethylmethacrylimide or mixtures thereof; or
- (b) polysulfone, polyethersulfone, polyimide, polyetherimide, polymethylmethacrylimide and sulfonated polysulfone, sulfonated polyethersulfone, sulfonated polyetherimide, sulfonated polymethylmethacrylimide or mixtures thereof.

24. The method according to claim 20, comprising at least one additive which is selected from the group consisting of polyethylenimine or a polyamine or polyethlyenimine and a polyamine.

* * * * *